J. LAURICH.
AUTOMOBILE HINGE.
APPLICATION FILED APR. 14, 1914.

1,118,938.

Patented Dec. 1, 1914.

WITNESSES:
H. E. Hartwell
Edith M. Potter

INVENTOR.
Joseph Laurich.
BY
Chapin & Co.
ATTORNEY.

UNITED STATES PATENT OFFICE.

JOSEPH LAURICH, OF SPRINGFIELD, MASSACHUSETTS.

AUTOMOBILE-HINGE.

1,118,938.  Specification of Letters Patent.  Patented Dec. 1, 1914.

Application filed April 14, 1914. Serial No. 831,745.

*To all whom it may concern:*

Be it known that I, JOSEPH LAURICH, a subject of the Emperor of Austria-Hungary, residing in the city of Springfield, county of Hampden, and State of Massachusetts, have invented certain new and useful Improvements in Automobile-Hinges, of which the following is a specification.

This invention relates to hinges and more particularly to the so-called concealed hinge.

An object of the invention is to provide a concealed hinge which is simple and inexpensive to manufacture.

Another object of the invention is to provide in a hinge of the class described, improved mechanical structure whereby the hinge is made durable and strong.

Another object is to provide improved means for attaching the hinge to the door casing.

Other objects and advantages will appear in the body of the specification and particularly pointed out in the claim.

Figure 1:
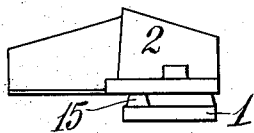
Figure 3:
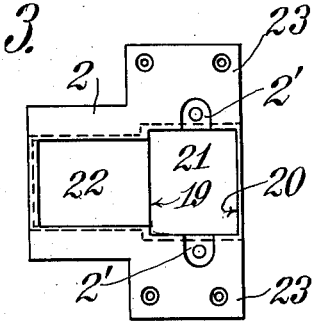
Figure 2:
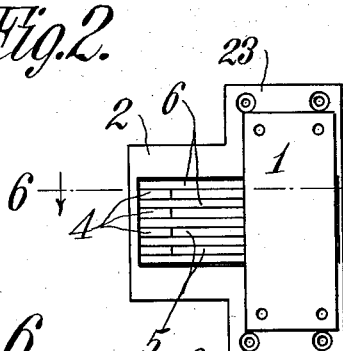
Figure 4:
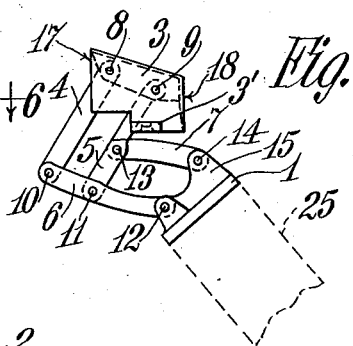
Figure 6:
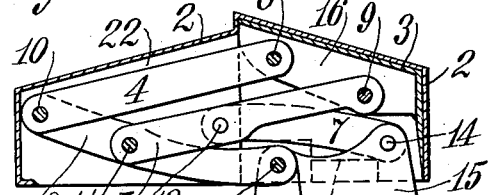
Figure 5:
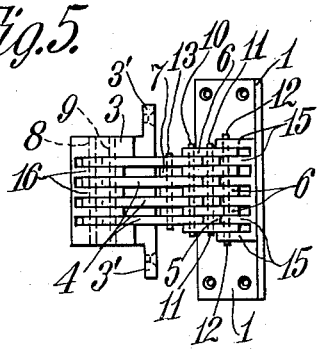
Figure 7:
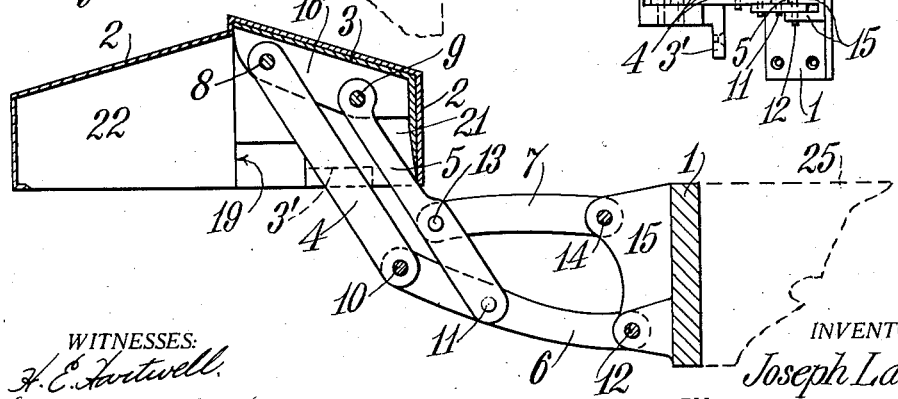

A preferred embodiment of my invention is illustrated in the accompanying drawings in which:

Figure 1 is a plan view of my improved hinge. Fig. 2 is a front elevational view thereof. Fig. 3 is a front elevational view of the hinge casing with the hinge structure removed therefrom. Fig. 4 is a plan view of the hinge structure removed from the casing. Fig. 5 is a side elevational view of the device shown in Fig. 4. Fig. 6 is a sectional plan view on an enlarged scale, taken on the line 6—6 of Fig. 2 and looking in the direction of the arrows. Fig. 7 is a view similar to Fig. 6, showing the parts in another position.

A casing 2 formed as shown in Figs. 1, 2, and 3 is adapted to receive the hinge structure as a unit. This casing 2 is preferably set into the door casing or wall and secured thereto by screws passing through the flanges 23. The links comprising the hinge structure, are mounted within a second casing 3, a detail view of which is shown in Fig. 4. This casing 3 is adapted to fit closely within the recess 21 of the casing 2 and the edges 17 and 18 are arranged to bear against the surfaces 19 and 20. A pair of lugs 3', which are integral with the casing 3, are designed to lie within and closely fit a pair of recesses 2' in the casing 2. A recess 22 in the casing 2 is provided to receive the link structure of the hinge to be described.

It is to be noted particularly that the structure described forms a strong and substantial support for the hinge and door. The heavy flanges 23 extend considerably above the casing 2 and allow the latter to be rigidly secured to the wall or door casing. The casing 3 fits snugly within the casing 2 and is secured thereto by screws passing through the lugs 3'. Any strain on the hinge structure is transferred directly to the surfaces 19 and 20 of the casing 1. Thus as the casing 2 is rigidly secured to the wall and the casing 3 is mounted in the closely fitting recess 21, the structure is well adapted to receive any reasonable strain which may be placed upon it.

Pivotally mounted at 8, in lugs 16 in the casing 3, are a number of links 4, as shown four in number are employed. A second set of links 5 are also pivotally mounted at 9 in the lugs 16, and are arranged in parallel relation to the links 4. Another set of links 6 are pivotally connected at 10 with the links 4, at 11 with the links 5, and at 12 to lugs 15 which latter are integral with a plate 1. A fourth set of links 7 are pivotally connected to the links 5 at a point 13 which lies intermediate the pivots 9 and 11. The other end of the links 7 are connected at 14 to the lugs 15 which, as described, are integral with the plate 1. The plate 1 is a hinge plate and is adapted to be secured to a door, as indicated at 25 in dotted lines. Fig. 6 shows the position of the parts when the door 25 is in a closed position. All the links 4, 5, 6, and 7 lie within the recesses 21 and 22 and are concealed from view. Fig. 7 shows the relative position of parts when the door is fully opened. It will be noted in Fig. 7 that the door 25, not only has been rotated ninety degrees from the position shown in Fig. 6, but, has been carried a considerable distance away from the casings 2 and 3. The link 7 serves to prevent rotation of the door 25 on the pivot 12 which would be possible and undesirable were the pivot 14 removed. Furthermore, this link 7 also constrains the door 25 to move always in a fixed and definite path. Thus, I have provided an improved mechanical structure in a concealed hinge.

The structure as a whole is strong and durable and is attached to the door casing in an improved and efficient manner.

It is recognized that many changes and modifications may be made in the structure above described without departing from the scope of my invention which is more truly defined by the appended claim.

What I claim is:

In a hinge, the combination with a casing open at the front side thereof and adapted to be set into a door casing, of a second casing secured to and within said first named casing, a plate adapted to be secured to a door, a set of links having one end thereof pivoted within said second casing, a second set of links arranged in parallel relation to said first set and having one end pivoted within said second casing, a third set of links pivotally connected to said first and second sets and to said plate, and a fourth set of links pivotally connected to said second set and to said plate, as described.

JOSEPH LAURICH.

Witnesses:
HARRY W. BOWEN,
H. E. HARTWELL.